US008635440B2

(12) United States Patent
Statia

(10) Patent No.: US 8,635,440 B2
(45) Date of Patent: Jan. 21, 2014

(54) PROXY WITH LAYER 3 SECURITY

(75) Inventor: Jeromy S. Statia, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 1358 days.

(21) Appl. No.: 11/955,539

(22) Filed: Dec. 13, 2007

(65) Prior Publication Data

US 2009/0158416 A1 Jun. 18, 2009

(51) Int. Cl.
*H04L 29/06* (2006.01)

(52) U.S. Cl.
USPC .......................... 713/153; 713/165; 370/466

(58) Field of Classification Search
USPC ................... 713/153, 165; 370/466
See application file for complete search history.

(56) References Cited

U.S. PATENT DOCUMENTS

| 6,118,784 | A | 9/2000 | Tsuchiya et al. |
| 7,006,526 | B1 | 2/2006 | Biederman |
| 7,085,270 | B2 | 8/2006 | Inouchi et al. |
| 2002/0091921 | A1* | 7/2002 | Kunzinger .................... 713/153 |
| 2003/0041266 | A1 | 2/2003 | Ke et al. |
| 2004/0015720 | A1 | 1/2004 | Dubuque |
| 2004/0133692 | A1 | 7/2004 | Blanchet et al. |
| 2004/0205336 | A1 | 10/2004 | Kessler et al. |
| 2005/0034131 | A1 | 2/2005 | Deshpande |
| 2005/0267978 | A1 | 12/2005 | Satapati |
| 2005/0286553 | A1* | 12/2005 | Wetterwald et al. .......... 370/466 |
| 2006/0010486 | A1 | 1/2006 | Lu et al. |
| 2006/0020787 | A1* | 1/2006 | Choyi et al. .................. 713/165 |
| 2006/0029081 | A1 | 2/2006 | Yan et al. |
| 2006/0153230 | A1 | 7/2006 | Miyata et al. |
| 2006/0251088 | A1 | 11/2006 | Thubert et al. |
| 2007/0162746 | A1 | 7/2007 | Kwon et al. |

OTHER PUBLICATIONS

International Search Report and Written Opinion Received for PCT Application No. PCT/US2008/084967, mailed on May 22, 2009, 11 pages.
Savola, "Migration and Co-existence of IPv4 and IPv6 in Residential Networks", pp. 1-14.
Smith et al., "Network Security using NAT and NAPT", ICON 2002, pp. 10-16.
Srisuresh, P.,"IP Network Address Translator (NAT) Terminology and Consideration", Request for Comments, Aug. 1999, Network Working Group, The Internet Society.

* cited by examiner

*Primary Examiner* — Brandon Hoffman
*Assistant Examiner* — Thong Truong

(57) ABSTRACT

A proxy system may use Layer 3 security mechanisms to establish secure communications between two devices. Each device may establish a secure session with the proxy using the same or a different configuration of a secure session. The proxy may pass traffic between the two devices and perform translation of the traffic between the two secure sessions. The proxy may also perform application layer gateway translations for communication traffic. Some embodiments may comprise a distribution or master proxy that may assign a communication session to a slave proxy in a scalable architecture.

20 Claims, 3 Drawing Sheets

200
SYSTEM WITH MULTIPLE SLAVE PROXIES

PROXY WITH LAYER 3 SECURITY

BACKGROUND

Communication networks such as computer data networks may be partitioned in many different manners. In many cases, a company or enterprise may have a local area network that may be separated from the Internet or other wide area networks through a gateway or firewall. In many cases, a private or internal network may use certain communications protocols that may be different than those used outside the network.

Further, various security mechanisms may be available to authenticate two devices and encrypt communications between the two devices. The security mechanisms may be used for cases where sensitive information is being passed and where authentication may be desired between the two devices.

A TCP/IP model has been used to describe many aspects of network architectures. Layer 5, the application layer, may be used by most programs for network communication. Data may be passed from the program in an application-specific format, then encapsulated into a transport layer protocol. Layer 4, the transport layer, includes end to end message transfer capabilities independent of the underlying network. Layer 3, the network layer, may perform the tasks of getting packets of data from source to destination. Layer 2, the data link layer, may describe various methods used to move packets between hosts. Layer 1, the physical layer, may describe the encoding and transmission of data over network communications media.

SUMMARY

A proxy system may use Layer 3 security mechanisms to establish secure communications between two devices. Each device may establish a secure session with the proxy using the same or a different configuration of a secure session. The proxy may pass traffic between the two devices and perform translation of the traffic between the two secure sessions. The proxy may also perform application layer gateway translations for communication traffic. Some embodiments may comprise a distribution or master proxy that may assign a communication session to a slave proxy in a scalable architecture.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
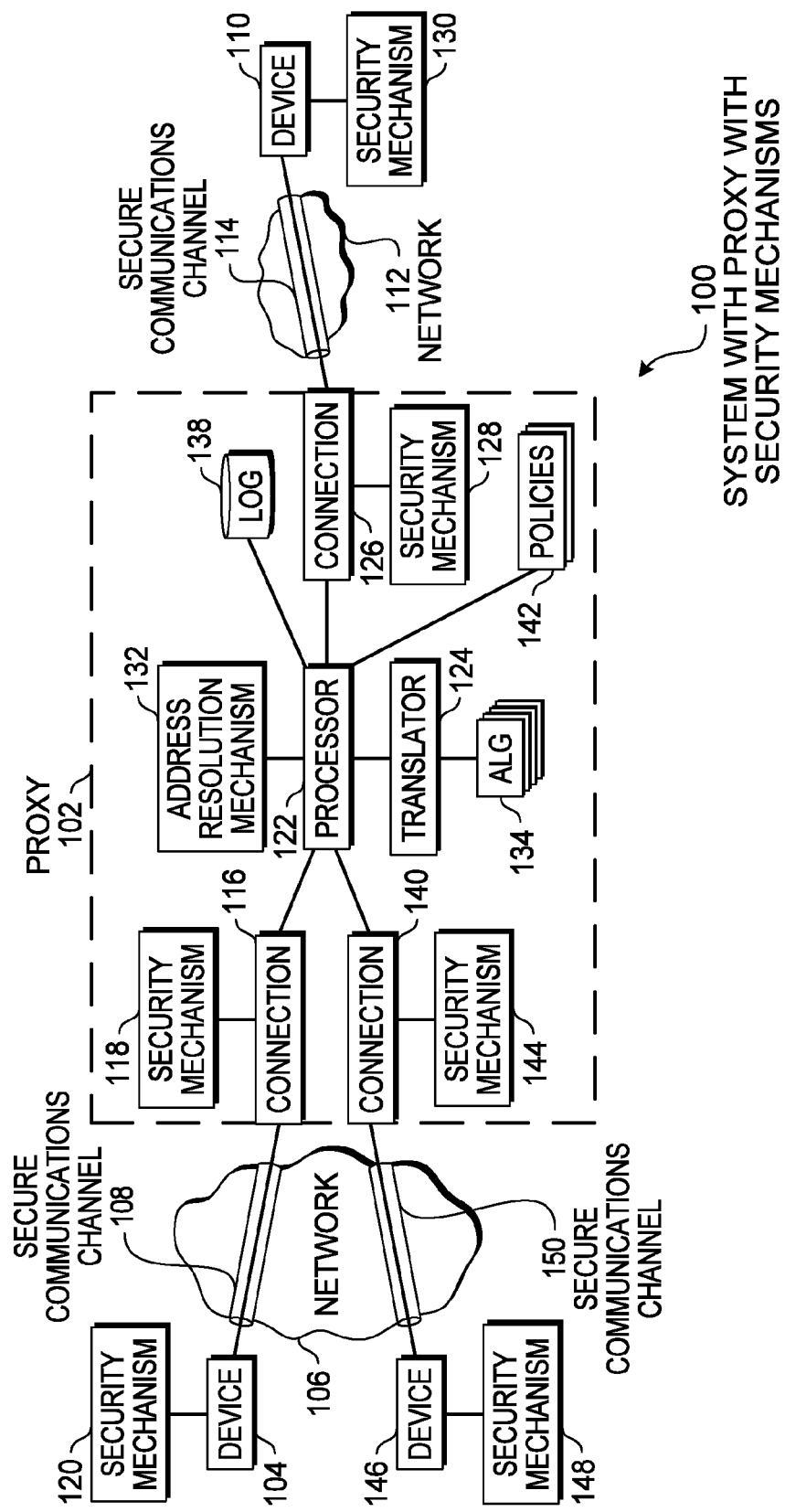
FIG. 1 is a diagram illustration of an embodiment showing a system with a proxy with security mechanisms.

A proxy may establish a secure connection with one device and a secure connection with another device to facilitate communications between the two devices. The proxy may be capable of using one type of secure connection with the first device and a second type of secure connection with another device. In some embodiments, the proxy may connect to the first device using IPv4 and the second device using IPv6.

A system of proxies comprising a master proxy and one or more slave proxies may be used in some applications. One such application may be as a gateway or edge to a local area network. When the proxies are configured as a system, one or more master proxies may receive initial requests for a connection, and the connection may be assigned to a slave proxy that may perform the actual connection and perform various translation services.

A proxy may perform various translation services between two devices. In many cases, the proxy may translate from one secure connection to another. Some embodiments may also include various application layer gateway translators that may translate from one connection to another using various application layer translators.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing a system with a proxy 102. Embodiment 100 is an example of a system that may provide secure communications between two or more devices with compatible or incompatible security mechanisms.

The diagram of FIG. 1 illustrates functional components of a system. The components are illustrated as functional components and may not correspond to a specific hardware, software, or other component. The illustrated components were selected to highlight and describe various functional aspects of a system. Different embodiments may use various hardware and software architectures to achieve similar functions.

In some cases, the component may be a hardware component, a software component, or a combination of hardware and software. Some of the components may be application level software, while other components may be operating system level components, hardware devices, or other elements. Some components may be composed of hardware, software, firmware, and other elements. In some cases, the connection of one component to another may be a close connection where two or more components are operating on a single hardware platform. In other cases, the connections may be made over network connections spanning long distances.

Embodiment 100 is an example of proxy 102 that may provide secure communications between two or more devices. A secure communications channel may be established between each device and the proxy 102, and the proxy 102 may translate between the two secure communications channels. In some cases, the proxy may provide other types of translations, including various application layer gateway functions.

The proxy 102 may enable devices with one type of security mechanism to communicate with devices having another type of security mechanism. In some cases, the security mechanisms may be similar but different settings may be used. Some security mechanisms may use authentication between the devices, and the proxy 102 may authenticate itself to one device on one connection and authenticate itself to another device on another connection.

Embodiment 100 is an example of a proxy 102 that may provide a secure connection between a device 104 connected to the proxy 102 through a network 106. The device 104 may connect to the proxy 102 using a secure communications channel 108. The proxy 102 may connect to a device 110 through a network 112 using a secure communications channel 114. The proxy 102 may take communications from one device, perform translations, and send the communications out to the other device.

In many embodiments, the proxy 102 may serve as a gateway to a local area network. For example, the network 106 may be the Internet or other wide area network while the network 112 may be a local area network such as an intranet within a company or other organization.

In some embodiments, the proxy 102 may be located on the Internet. In such an embodiment, the networks 106 and 112 may both be portions of the Internet.

The secure communications channel 108 to the device 104 may be performed by a connection 116. The connection 116 may have a security mechanism 118 that may operate in conjunction with the security mechanism 120 of the device 104 to establish the secure communications channel 108. In some embodiments, the security mechanisms 118 and 120 may be a Layer 3 security mechanism. One example of such a Layer 3 security mechanism may be IP Security ('IPsec').

IPsec and other Layer 3 security mechanisms may provide various types of security functions. One such function is authentication, where each device may authenticate itself to the other so that both devices have assurance that the other device is not an imposter or interloper. Another function may be encryption, where communications between the devices is encrypted so that an eavesdropper may not intercept and understand the transmissions. Encryption or other mechanisms may also be used to ensure that traffic along the secure communications channel 108 has not been modified along the path.

Another secure communications channel 114 may be established to device 110 using a connection 126 and security mechanism 128 on the proxy 102. In many embodiments, the security mechanisms 128 and 120 may be similar to security mechanisms 118 and 120 used with connection 108. In some cases, the secure communications channels 108 and 114 may be operated using the same protocols and settings, while in other cases, two different protocols may be used. Some cases may use the same protocols but different settings between the two connections.

In some embodiments, one of the secure communications channels 108 or 114 may be an Internet Protocol version 4 ('IPv4') connection while the other channel may be an Internet Protocol version 6 ('IPv6') connection. In some cases, both channels may be operated using IPv6, and in other cases both channels may be operated using IPv4.

The proxy 102 may contain a processor 122 that operates a translator 124. The translator 124 may receive an incoming communication and translate the communication to be compatible with an outgoing communications channel. In many cases, the translator 124 may translate between a secure communications channel with one security protocol to another secure communications channel with another security protocol.

The proxy 102 may incorporate an address resolution mechanism 132. The address resolution mechanism 132 may perform operations such as domain name system (DNS) lookups. When an incoming communication is received, the communication may include a request to establish a communication session with another device. The request may contain a host name or other descriptor which may be analyzed by the address resolution mechanism 132 to determine a network address for the host. The network address may be used to establish a communication session with the requested device.

In some embodiments, the translator 124 may incorporate one or more application layer gateway 134 ('ALG'). An application layer gateway 134 may be a security component that may allow address and port translation for various application layer protocols. An application layer gateway 134 may analyze the contents of a communications packet at the application layer, or Layer 5 of the TCP/IP model. In such a case, the ALG may perform deep packet inspection of the communications.

An application layer gateway 134 may recognize application-specific commands within a communications packet and offering granular security controls over them. In some cases, an ALG may synchronize between multiple streams/sessions of data between two hosts exchanging data. For example, a File Transfer Protocol ('FTP') application may use separate connections for passing control commands and for exchanging data between the client and a remote server. During large file transfers, the control connection may remain idle. An ALG can prevent the control connection getting timed out by network devices before the lengthy file transfer completes.

The proxy 102 may enable various application layer gateways 134 to be added to the proxy 102. Sometimes, such an additional functionality may be provided by a plugin module. In some cases, such a plugin module may be a software component that may be installed, while in other cases the plugin module may be a removable hardware component.

The proxy 102 may include a log 138 that may be used to track various requests. The log 138 may be used to track usage of the proxy 102 and may include entries of each request for a communication. Such entries may include a requestor's identification and the device or address of a requested communications path. Usage information may be used for auditing or tracing various user actions on a network.

The log 138 may also be used to track various performance parameters of the proxy 102 and the communication sessions established with the proxy 102. In some cases, the log 138 may be used to generate various performance statistics relating to the traffic passed through the proxy 102.

In one use scenario, the proxy 102 may be used to provide separate and secure connections to different customers of a service. In the scenario, a web service may be hosted by the device 110 that may be located within a local area network. A first customer of the web service may use the device 104 may establish a first secure communications channel 108 using a security protocol and settings that are specifically designated for that customer. A second device 146 may be used by a different customer to establish a second secure communications channel 150.

Following the use scenario, the second secure communication channel 150 may be established with a proxy connection 140 that may use a security mechanism 144 that may correspond with the security mechanism 148 on the device 150. A set of policies 142 may be used to enforce rules that enable communication between the device 104 and the device 110 as well as communication between the device 146 and the device 110, but may not allow communication between the device 104 and device 146.

The use scenario may enable various customers or clients to have individually defined security settings or use security protocols or other mechanisms that are individually assigned to each customer or client. The proxy 102 may be configured with a specially configured connection and security mechanism that may correspond with a customer's predefined security mechanism in some cases, enabling a remote service or connection to be offered while complying with the customer's predefined security mechanisms.

Figure 2:
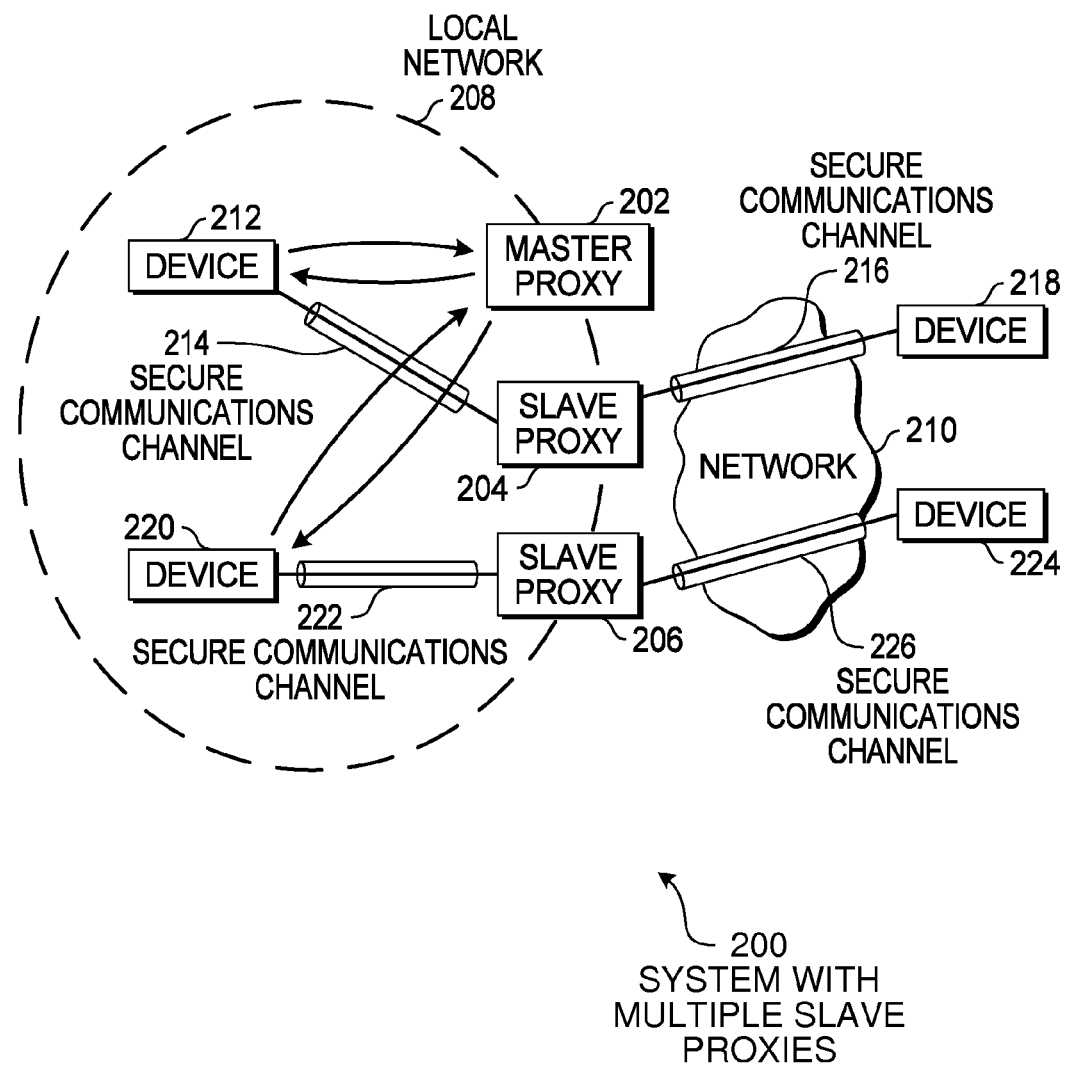
FIG. 2 is a diagram illustration of an embodiment showing a system with multiple slave proxies.

FIG. 2 is a diagram illustration of an embodiment 200 showing a system with multiple slave proxies. The components are illustrated as functional components and may not correspond to a specific hardware, software, or other component. The illustrated components were selected to highlight and describe various functional aspects of a system. Different embodiments may use various hardware and software architectures to achieve similar functions.

In some cases, the component may be a hardware component, a software component, or a combination of hardware and software. Some of the components may be application level software, while other components may be operating system level components, hardware devices, or other elements. Some components may be composed of hardware, software, firmware, and other elements. In some cases, the connection of one component to another may be a close connection where two or more components are operating on a single hardware platform. In other cases, the connections may be made over network connections spanning long distances.

Embodiment 200 is an example of a proxy system that may have one or more master proxies 202 and one or more slave proxies 204 and 206. The master proxy 202 may receive an initial communication request and may be capable of transferring the request to one of the slave proxies 204 or 206. The slave proxies 204 may establish secure connections and perform the various translation operations.

In the example of the proxy 102 illustrated in FIG. 1, the proxy 102 may perform all of the functions of receiving a communication request, establishing secure connections to the various devices, and perform translations between the communicating devices. The example of embodiment 200 shows a similar functionality, but multiple slave proxies may perform the functions of establishing secure connections and performing ongoing translations.

The architecture of embodiment 200 shows an extensible and high throughput embodiment where multiple slave proxies may be used as a gateway or edge to a local network 208. By adding additional slave proxies, embodiment 200 may be easily expanded for higher bandwidth applications. The slave proxies may be assigned with various communication sessions in order to balance the communication and traffic load between the slave proxies.

The master proxy 202 may receive a request from a device 212 for a connection to device 218 accessible through the network 210. The master proxy 202 may perform some address resolution functions such as perform a DNS query to determine an address for the device 218.

The master proxy 202 may assign the communication session for device 212 to the slave proxy 204. The slave proxy 204 may establish a first secure communications channel 214 with device 212 and a second secure communications channel 216 with device 218. The slave proxy 204 may perform various translation functions to facilitate the communication between device 212 and device 218.

Similarly, the master proxy 202 may receive a request from device 220 for a connection to device 224. After determining an address or performing other preliminary actions, the master proxy 202 may assign the communication session for device 220 to the slave proxy 206. The slave proxy 206 may establish a first secure communications channel 222 with device 220 and a second communications channel 226 with device 224. The slave proxy 206 may perform various translation functions to facilitate the communication between device 220 and device 224.

In some embodiments, the master proxy 202 may also be capable of establishing secure connections between two devices and performing translation functions between the two secure connections, similar to the proxy 102.

Embodiment 200 illustrates a second use scenario for a secure proxy system. The master proxy 202 and slave proxies 204 and 206 may be used as a gateway for establishing outbound communications between devices 212 and 220 within the local network 208 to devices 218 and 224 connected to a network 210 that may comprise the Internet.

Some embodiments may use a single proxy, as in embodiment 100. Other embodiments may use multiple proxies as in embodiment 200. In a multiple proxy embodiment, one or more proxies may be designated as master proxies that may process initial communication requests. The master proxy may be capable of transferring the request to different slave proxies in order to balance the traffic load across multiple proxies. In some cases, a single proxy may be capable of handling all the traffic, while in larger applications, many proxies may be used.

Embodiment 200 may be used to establish secure connections between devices using either IPv4 or IPv6 protocols. In some cases, devices within a local network 208 may use IPv6 while the devices 218 and 224 may be accessible through a network 210 that uses IPv4. In other cases, the local network 208 may use IPv4 while the network 210 uses IPv6. In each case, the proxies may provide translation services for establishing secure communications between the two IP protocols.

Figure 3:
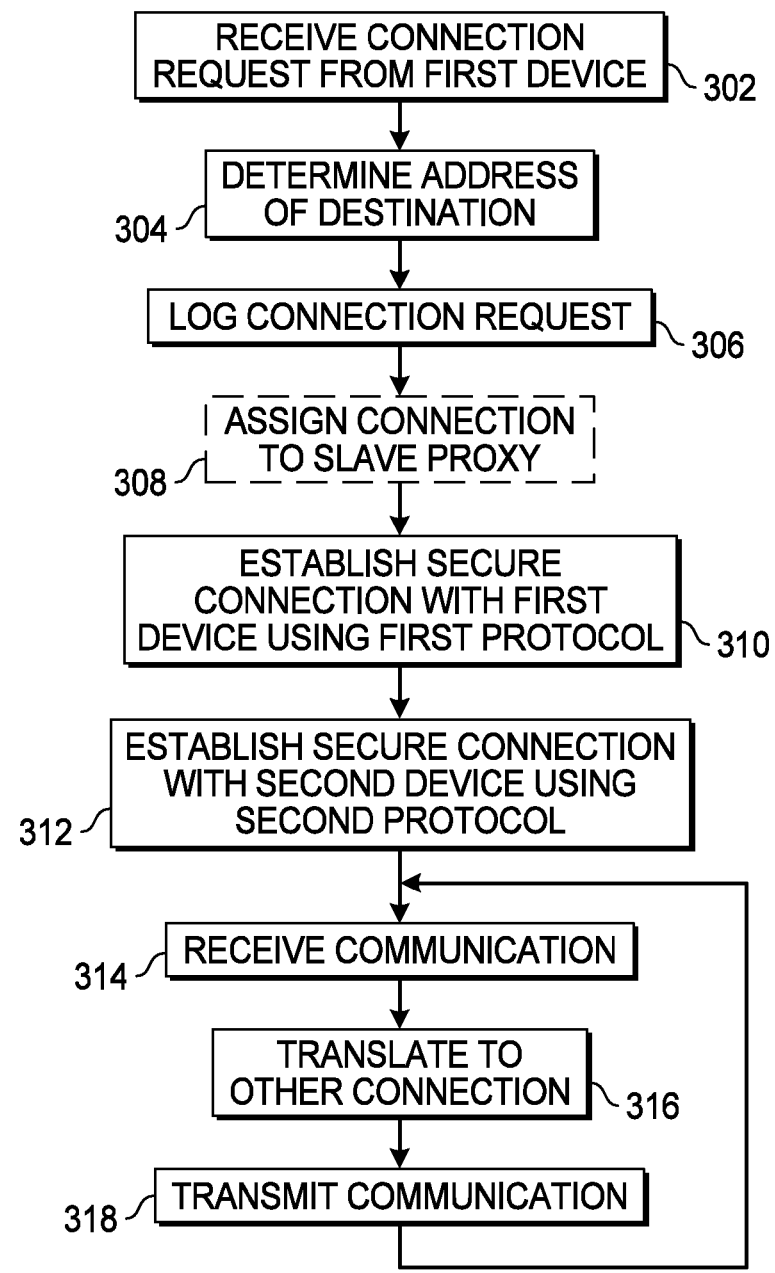
FIG. 3 is a flowchart illustration of an embodiment showing a method of performing a proxy operation.

FIG. 3 is a flowchart illustration of an embodiment 300 showing a method for operating a proxy system. Embodiment 300 is merely one example of a sequence of steps that may be performed by a proxy system. In some embodiments, a single device may perform all of the steps, while in other embodiments, two or more devices may perform the steps. Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 illustrates a simplified example of the operations of a proxy system. Embodiment 300 may be used by a single proxy device or may be performed across two proxy devices arranged as master and slave proxies.

A connection request may be received from a first device in block 302. The connection request may be transmitted using an unsecure connection in some embodiments. In other embodiments, the connection request 302 may be transmitted using a secure connection.

The connection request may include a host name or other designator for a destination device. An address may be resolved in block 304 by performing a DNS query against an internal database of host names and addresses or by querying a public DNS server.

In some embodiments, the connection request may include a network address. In such embodiments, the operation of block 304 may be skipped.

The connection request may be logged in block 306. Logging may be performed at different stages of the operation of a proxy server, depending on what information may be collected and how the information may be used. For example, some embodiments may log each connection request. Such information may be used for auditing which user or device has made requests for which devices.

Other embodiments may log each packet of data that is passed across the proxy from one device to another. Such embodiments may track data for performance analysis, such as determining the effective bandwidth or data transfer rate. Such embodiments may also log packets for data content for auditing or tracing data transmissions.

In embodiments where two proxies are arranged in a master/slave arrangement, a master proxy device may assign the connection request to a slave proxy in block 308. In a single device embodiment of a proxy, the operation of block 308 may be omitted.

A secure connection may be established with a first device using a first secure protocol in block 310 and a second secure connection may be established with a second device using a second secure protocol in block 312. Communication may be received in block 314, translated to the other connection in block 316, and transmitted in block 318.

The first and second secure protocols of blocks 310 and 312 may be the same security protocols with the same settings, different protocols with different settings, or the same protocols with different settings. Other configurations may also be used.

In many embodiments, a Layer 3 security mechanism may be used to establish various levels of security. An example of a Layer 3 security protocol may be IPsec. In some embodiments, authentication, encryption, or other secure features may be used with a Layer 3 security protocol.

Many embodiments may have symmetric security mechanisms where the security features are applicable for communication traffic in either communication direction. Some embodiments may have asymmetric security where one communication direction may have one or more security mechanisms that are not available on the other communication direction.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A system comprising:
    a first connection configured to receive a connection request from a first device, said connection comprising a designator for a second device;
    a first secure connection to said first device, said first secure connection comprising a first Layer 3 security protocol;
    a second secure connection to said second device, said second secure connection comprising a second Layer 3 security protocol;
    a translator configured to receive communications from said first secure connection and send said communications out said second secure connection;
    a master proxy and a slave proxy, the master proxy configured to establish said first connection with said first device, to receive said connection request from said first device, and to assign said connection request to the slave proxy; and
    the slave proxy configured to establish said first secure connection and said second secure connection, said first secure connection not being routed through said master proxy.

2. The system of claim 1 being located at an edge of a local area network.

3. The system of claim 1, said translator comprising a Layer 3 translator.

4. The system of claim 3 further comprising:
an application layer gateway configured to translate between said first secure connection and said second secure connection, said application layer gateway being configured to translate on Layer 4 or higher.

5. The system of claim 1, said first secure connection being an IPv6 connection and said second secure connection being an IPv4 connection.

6. The system of claim 1, said second secure connection being an IPv6 connection and said first secure connection being an IPv4 connection.

7. The system of claim 1, said first Layer 3 security protocol comprising IPsec.

8. The system of claim 1, said first secure connection having a first security configuration and said second secure connection having a second security configuration.

9. The system of claim 1 further comprising an address resolution mechanism configured to determine a network address for said second device based on said designator.

10. The system of claim 1 further comprising:
a third secure connection to a third device, said third secure connection comprising a third Layer 3 security protocol, said translator being further configured to receive said communications from said third secure connection and send said communications out said second secure connection.

11. The system of claim 1, further comprising:
a plurality of third devices each sending to the master proxy a request for a connection with another device; and
a plurality of slave proxies,
wherein the master proxy assigns each request for a connection to a slave proxy from among the plurality of slave proxies.

12. A method performed by a computer processor, said method comprising:
receiving a connection request from a first device, said connection request comprising a designator for a second device, said connection request being received by a master proxy device;
assigning, by said master proxy device, said connection request to a slave proxy device;
establishing a first secure connection using a first Layer 3 security protocol to said first device, said first secure connection being made between said first device and said slave proxy device, said first secure connection not being routed through said master proxy device;
establishing a second secure connection using a second Layer 3 security protocol to said second device, said second secure connection being made between said second device and said slave proxy device; and
passing communications and translating between said first secure connection and said second secure connection.

13. The method of claim 12 further comprising:
providing at least one application layer gateway function between said first secure connection and said second secure connection.

14. The method of claim 12, said first secure connection being an IPv6 connection and said second secure connection being an IPv4 connection.

15. The method of claim 12, said second secure connection being an IPv6 connection and said first secure connection being an IPv4 connection.

16. The method of claim 12, said first Layer 3 security protocol comprising IPsec.

17. The method of claim 12, said second Layer 3 security protocol comprising IPsec.

18. The method of claim 12, said first secure connection having a first security configuration and said second secure connection having a second security configuration.

19. The method of claim 12 further comprising:
establishing a third secure connection using a third Layer 3 security protocol to a third device; and
passing communications and translating between said third secure connection and said second secure connection while preventing communications between said third secure connection and said first secure connection.

20. A computer readable medium not comprising propagated waves but comprising computer executable instructions configured to perform the method of claim 12.

* * * * *